Dec. 2, 1930.  C. G. KELLER  1,783,432
VEHICLE WHEEL HUB CONSTRUCTION
Filed March 29, 1928  2 Sheets-Sheet 1
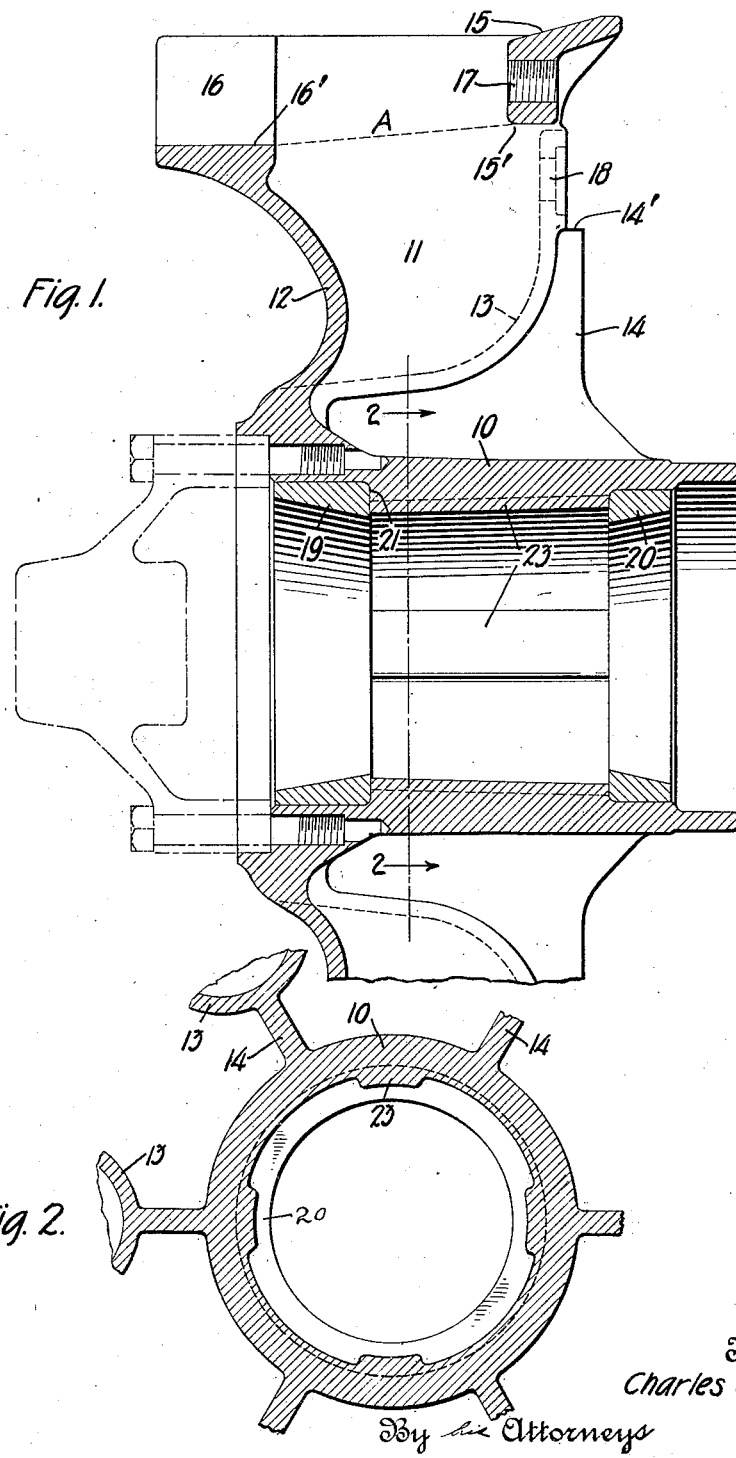
Inventor
Charles G. Keller.
By his Attorneys Dec. 2, 1930.  C. G. KELLER  1,783,432
VEHICLE WHEEL HUB CONSTRUCTION
Filed March 29, 1928   2 Sheets-Sheet 2
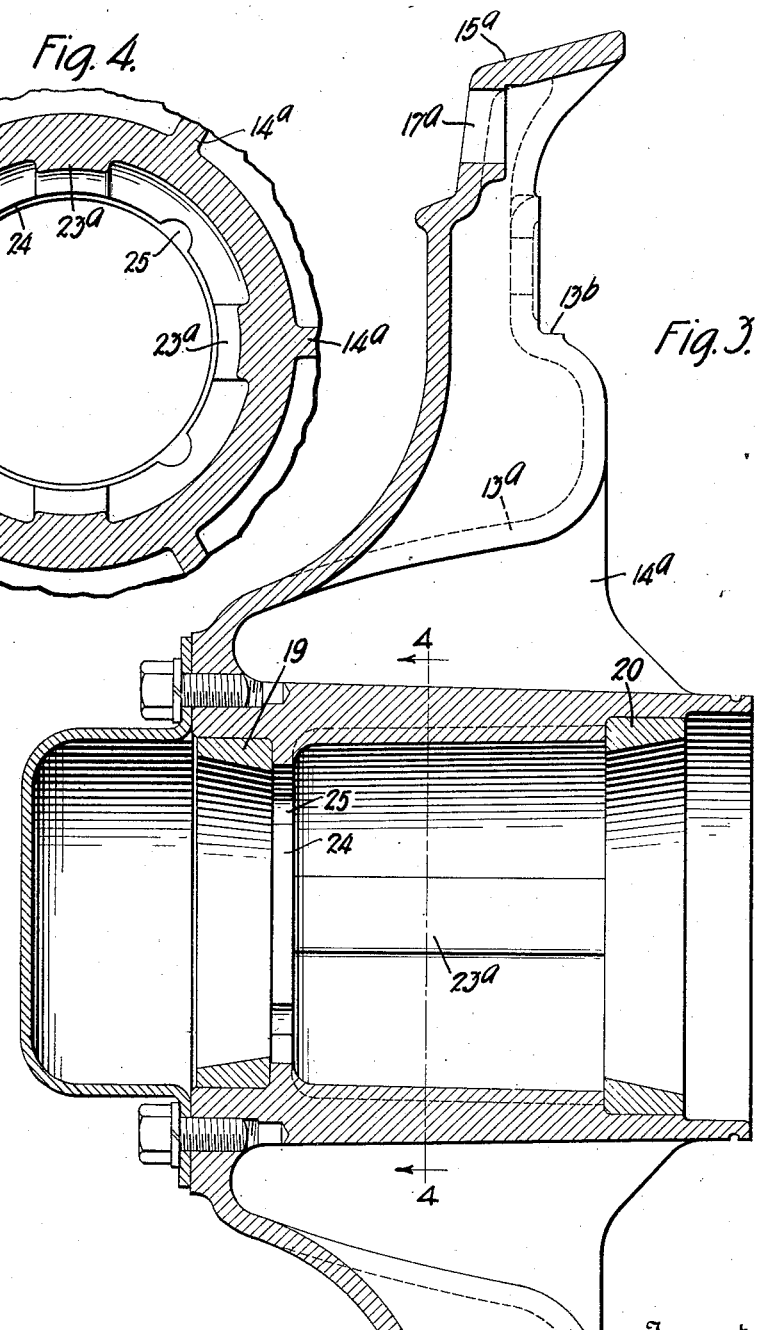
Inventor
Charles G. Keller.
By his Attorneys Patented Dec. 2, 1930

1,783,432

UNITED STATES PATENT OFFICE

CHARLES G. KELLER, OF POUGHKEEPSIE, NEW YORK

VEHICLE WHEEL-HUB CONSTRUCTION

Application filed March 29, 1928. Serial No. 265,575.

This invention relates to vehicle wheels of the type in which the hub is of cast metal and is preferably integral with the spokes which at their outer ends directly support the removable rim or rims.

One important object of the present invention is to provide for the adequate seating and spacing of the bearing race rings with the minimum of metal and machining and foundry operations.

As one important feature of the invention the parts are so designed that the hub and spokes may be cast in a two-part green sand mould without the use of cores, so that great accuracy and economy in casting is secured and the complete wheel is produced at very low cost.

The bearing race rings are usually spaced apart near opposite ends of the hub, and their inner surfaces are frustro-conical or like construction, whereby there is a very considerable end thrust on the rings tending to move them toward each other.

In my improved construction I provide flanges or ribs on the inner surface of the hub which permit the intermediate portion of the hub to be comparatively thin but of the desired strength. These ribs or flanges at one end or both ends serve to limit the axial movement of the bearing race rings, and the spacing between the ribs or flanges gives adequate area for the application of a tool to drive out the bearing race ring in case it is necessary to replace or repair the latter. The bearing race rings may abut against comparatively narrow shoulders around the entire circumference, but the main resistance to axial movement is afforded by the flanges which extend inwardly radially to give support across a wide area of the end wall of the race ring.

Preferably the flanges or ribs are slightly tapered both as to radial dimension or height and as to circumferential dimension or width so that in casting the hub in a green sand mould, it is easy to remove the pattern from the sand and it is not necessary to use cores. The cost of the casting operation is thus reduced to a minimum and the only machining operation required for the inner surface is the turning of the seats and the shoulders for the two race rings.

In the accompanying drawings I have shown two embodiments of my invention. In these drawings I have illustrated only the hub and spokes which are cast integral. The specific construction of the spokes forms no portion of the invention hereinafter claimed, as such construction, together with the cooperating detachable parts not here illustrated, are claimed in copending applications. The spoke ends as illustrated may serve to receive tire rim retaining means such as that illustrated in my application, Serial No. 154,092, filed December 11th, 1926.

In the drawings:

Fig. 1 is a central longitudinal section of a wheel spider embodying my invention and adapted to carry twill tire rims;

Fig. 2 is a transverse section on the line 2—2 of Fig. 1;

Fig. 3 is a section similar to Fig. 1, but showing a construction for a single tire; and Fig. 4 is a transverse section on the line 4—4 of Fig. 3.

In the construction illustrated in Figs. 1 and 2, the wheel spider has a hub 10 of substantially cylindrical form cast integral with a plurality of spokes 11. Each spoke is of substantially U-shape in cross-section, with side walls connected by an edge wall 12, whereby a substantially radial passage is formed along which air may flow due to centrifugal force or fan action, when the wheel is in use. The side walls at their inner ends do not extend all of the way into the hub except at one edge. They terminate in a web 13 which curves axially and radially between adjacent spokes. This web between the spokes is supported by ribs 14 in radial planes. At the outer end of each spoke there is an inclined seat 15 for a rim and a guideway 16 for a slide providing a seat for a second rim. The rim retaining means may be secured in a threaded aperture 17 in alignment with the guideway 16. The web 13 adjacent to its outer edge may have apertures 18 for the attachment of a brake drum. This brake drum may seat on and be centered by shoulders 14' on the outer ends of the webs 14.

As previously noted the construction of the spokes is not herein claimed. The parts are designed for rim securing mechanism such for instance as that shown in application 154,092.

The hub serves to support a pair of race rings 19 and 20 which have frusto-conical inner surfaces inclined outwardly in opposite directions. Thus the thrust on these race rings tends to move them toward each other. In my improved construction the wall of the hub between these race rings is made comparatively thin so as to provide narrow shoulders 21 and 22 facing in opposite directions, and against which the race rings abut. Between the race rings are a plurality of ribs or flanges 23 which have their ends flush with the surfaces of said shoulders so that the ends of these ribs or flanges constitute the main abutments for the race rings. To facilitate casting, the inner surface of the hub between the two shoulders tapers slightly, that is, it is larger adjacent to one ring, for instance the ring 20. Likewise, the ribs or flanges are tapered so that they are narrower and of larger internal diameter adjacent to the race ring 20.

Thus, a green sand mould may be employed with the two parts dividing on the plane of the shoulder 21, and no separate core is required. The inner surface 15' of the bridge piece carrying the seat 15 and the aperture 17 is farther from the axis of the hub than is the inner edge 16' of the guideway 16, so that the drag portion of the mould beneath the said bridge piece may be pulled out toward the right, as viewed in Fig. 1, and the cope part at the left of said bridge piece may be pulled out toward the left through the guideway 16. The parts of the mould will separate on a line indicated as a dotted line A in Fig. 1. The flanges or ribs serve not only to strengthen the body portion of the hub and to serve as abutments for the race rings, but they also provide spaces between the adjacent ribs whereby a tool may be inserted to drive out either race ring.

The construction illustrated in Figs. 3 and 4 has the outer ends of the spokes adapted for supporting a single rim rather than a pair of rims. The web 13a is curved so that a shoulder 13b serves as a seat for the inner edge of the brake drum, rather than seating on a shoulder at the end of the several webs 14a. The inclined surface 15a is intended to support the removable rim which is retained by clamping means mounted in the aperture 17a.

The body of the hub is substantially as shown in Figs. 1 and 2 except that there is provided an annular flange 24 presenting the shoulder against which the race ring 19 seats. The ribs or longitudinal flanges 23a merge into this flange. The ribs at their opposite ends serve as abutments for the race ring 20, as in Figs. 1 and 2. The race ring 20, is shown of larger diameter than the race ring 19, where as in Fig. 1 the reverse is the case. To facilitate the driving out of the race ring 19 the flange 24 may be provided with notches 26 into which a driving tool may be inserted.

Although the constructions above described embody various novel features, the invention herein claimed relates to the novel construction presented by or disposed within the inner surface of the hub. The hub preferably has the spokes cast integral, but it is within the scope of my invention to form the inner surface of a removable hub or hub liner in the manner hereinafter claimed. The hub liner may be secured to the body of the hub and serve the function of that illustrated and claimed in my prior application, Serial No. 154,092 above referred to.

Having thus described my invention, what I claim as new and desire to secure by Letters Patent is:—

1. A cast metal hub for vehicle wheels, having opposed annular seats therein for a pair of bearing race rings, and a plurality of ribs extending lengthwise along the inner surface, the ends of said ribs being in the same transverse planes as said seats.

2. A cast metal hub for vehicle wheels, having seats therein for a pair of bearing race rings, and a plurality of ribs extending lengthwise along the inner surface between said seats, and having their ends serving as abutments for spacing said race rings and resisting end thrust thereon.

3. A cast metal hub for vehicle wheels, having a pair of comparatively narrow annular shoulders, ribs extending from one shoulder to the other and terminating in the planes of the outer surfaces of said shoulders, and race rings seating against said shoulders and the ends of said ribs.

4. A cast metal hub for vehicle wheels, having ribs extending lengthwise of the inner surface and tapering both as to height and as to width toward one end, and a bearing race ring engaging with the smaller ends of said ribs and held against end thrust thereby.

5. A cast metal hub for vehicle wheels, including a cylindrical member having a pair of comparatively narrow shoulders at opposite ends bearing race rings seating against said shoulders, and a plurality of ribs on the inner surface of the member and tapering slightly from one of said shoulders to the other and terminating in the transverse planes of said shoulders, whereby they cooperate with the shoulders to resist end thrust on the bearing race rings and provide spaces therebetween in which a tool may be inserted for forcibly removing the bearing race rings.

6. A cast metal hub for vehicle wheels, including a cylindrical member having its terminal portions thinner than its central portion to provide annular oppositely facing shoulders upon the inner surface, and ribs extending lengthwise along the inner surface of the central portion and terminating in transverse planes substantially coinciding with said shoulders, and a pair of bearing race rings within the end portions of said hub and seating against said shoulders, the ends of said ribs coacting with said shoulders to resist end thrust on said rings.

7. A cast metal hub for vehicle wheels, including a cylindrical member having the center portion slightly tapered axially and the terminal portions of larger internal diameter whereby annular shoulders are formed at the ends of said central portion, and inwardly extending ribs on said central portion and having their ends registering with said shoulders, said ribs being tapered in the same direction as is the inner surface of the central portion carrying said ribs.

Signed at New York in the county of New York and State of New York this 19th day of March, A. D. 1928.

CHARLES G. KELLER.